(12) United States Patent
Lai

(10) Patent No.: US 7,359,009 B2
(45) Date of Patent: Apr. 15, 2008

(54) FLAT PANEL DISPLAY WITH STRUCTURE PREVENTING ELECTRODE LINE OPENINGS

(75) Inventor: Han-Chung Lai, Jungli (TW)

(73) Assignee: AU Optronics Corp., Hsinchu (TW)

( * ) Notice: Subject to any disclaimer, the term of this patent is extended or adjusted under 35 U.S.C. 154(b) by 4 days.

(21) Appl. No.: 10/747,462

(22) Filed: Dec. 29, 2003

(65) Prior Publication Data

US 2005/0088581 A1 Apr. 28, 2005

(30) Foreign Application Priority Data

Oct. 27, 2003 (TW) ............................... 92129732 A

(51) Int. Cl.
*G02F 1/136* (2006.01)
*G02F 1/1333* (2006.01)
*H01L 29/10* (2006.01)
*H01L 29/04* (2006.01)

(52) U.S. Cl. .................... 349/43; 349/54; 349/122; 349/138; 257/59; 257/72

(58) Field of Classification Search .............. 257/760, 257/59, 72; 349/139, 143, 122, 138, 52, 349/43

See application file for complete search history.

(56) References Cited

U.S. PATENT DOCUMENTS

| | | | | |
|---|---|---|---|---|
| 5,075,674 A | * | 12/1991 | Katayama et al. ............ | 345/93 |
| 5,155,564 A | * | 10/1992 | Hishida et al. ................ | 257/61 |
| 5,652,633 A | * | 7/1997 | Lee .............................. | 349/42 |
| 5,726,461 A | * | 3/1998 | Shimada et al. .............. | 257/59 |
| 5,811,846 A | * | 9/1998 | Miura et al. ................. | 257/291 |
| 5,929,463 A | * | 7/1999 | Stupp et al. .................. | 257/59 |
| 6,078,365 A | * | 6/2000 | Ueda et al. ................... | 349/43 |
| 6,529,258 B2 | * | 3/2003 | Watanabe et al. ........... | 349/143 |
| 6,548,831 B1 | * | 4/2003 | Tokuhiro et al. ............. | 257/72 |
| 6,855,954 B1 | * | 2/2005 | Zhang .......................... | 257/59 |

FOREIGN PATENT DOCUMENTS

JP 02020830 A * 1/1990

* cited by examiner

*Primary Examiner*—Andrew Schechter
*Assistant Examiner*—W. Patty Chen
(74) *Attorney, Agent, or Firm*—Thomas, Kayden, Horstemeyer & Risley

(57) ABSTRACT

A flat panel display with a structure preventing electrode line openings. The flat panel display includes a substrate, a gate line, an insulating layer, an etching buffer layer, and a data line. The gate line is disposed on the substrate. The insulating layer covers the gate line and the substrate. The etching buffer layer overlies the insulating layer and is aligned with the gate line. The data line is overlying the etching buffer layer and the substrate and extends perpendicular to the gate line. The etching buffer layer overlapping the data line has non-linear edges so as to prevent lateral etching during data line etching.

20 Claims, 7 Drawing Sheets

FLAT PANEL DISPLAY WITH STRUCTURE PREVENTING ELECTRODE LINE OPENINGS

BACKGROUND OF THE INVENTION

1. Field of the Invention

The present invention relates in general to a flat panel display, and more particularly, to a flat panel display with a structure preventing electrode line openings.

2. Description of the Related Art

Liquid crystal displays (LCDs) have the advantages of low power consumption, thin profile, light weight and low driving voltage and have been put to practical use with personal computers, navigation systems, and projectors. Owing to dielectric anisotropy and conductive anisotropy of liquid crystal molecules, molecular orientation of liquid crystals can be shifted under an external electronic field, such that various optical effects are produced. Generally, in an LCD panel, a liquid crystal layer is disposed between two transparent substrates, such as glass substrates. One of the transparent substrates has driving devices, such as thin film transistors (TFTs) disposed thereon. In the LCD panel, the array composed of pixel areas is defined by interlaced gate lines and date lines, and each pixel area has one TFT and one pixel electrode.

Generally, TFTs are usually classified into top gate and bottom gate types according to the TFT structure, and the bottom gate type TFT may further be classified into etch-back type and etch-stopper type, wherein the etch-stopper type TFT structure has a protective film disposed on the semiconductor layer to protective the channel layer.

Referring to FIGS. 1-3, in which FIG. 1 is a plane view of a conventional etch-stopper type TFT structure in a flat panel display, FIG. 2 is a cross-section along the 1-1' line in FIG. 1, and FIG. 3 is a cross-section along the 2-2' line in FIG. 1. The TFT structure includes a gate electrode 102a and a gate line 102b. Moreover, a source electrode 110a and a drain electrode 110b are respectively disposed on both sides of the gate electrode 102a. The source electrode 110a extends outwardly to form a data line 110c perpendicular to the gate line 110b. A passivation layer may be formed in two areas. One area is over the TFT, as the area T shown in FIG. 1. Another one is the overlapping area between the gate line 102b and the data line 110c, as the area P shown in FIG. 1. Here, in order to clearly differentiate the passivation layer formed in area T from the area P, the passivation layer formed in area T is referred to as channel protective layer (stopper-insulator, I-stop) and that formed in area P is referred to as etching buffer layer. A cross-section of area T is shown in FIG. 2. The channel protective layer 112a is disposed on the semiconductor layer 106 overlying the gate electrode 102a. Doped semiconductor layers 108a, 108b are respectively disposed on both sides of the channel protective layer 112a to serve as ohmic contacting layers for the source electrode 110a and the drain electrode 110b. Additionally, the etching buffer layer 112b formed in area P is disposed between the semiconductor layer 106 overlying the gate line 102b and the data line 110c.

However, the etching buffer layer 112b formed in area P is defined by rear exposure process using the underlying gate line 102b as a photomask, thus inducing lateral etching when the data line 110c overlying the buffer layer 112b is etched, resulting the data line 110c opening. FIG. 4 is an enlarged diagram of area P shown in FIG. 1. The etching buffer layer 112b with linear edges 112' may induce lateral etching. That is, etching is induced along a direction perpendicular to the direction of the data line 110c (as arrows depict in FIG. 4), resulting in data line 110c opening.

SUMMARY OF THE INVENTION

Accordingly, an object of the present invention is to provide a flat panel display with a structure preventing data line openings, which can suppress lateral etching by changing the profile of the etching buffer layer, rather than the conventional linear profile.

A key feature of the present invention is the different profile of the etching buffer layer, whereby the etching buffer layer overlap the data line having non-linear edges, thereby suppressing lateral etching, in which the etching direction for data line becomes perpendicular to the data line.

According to the object of the invention, a flat panel display with a structure preventing data line openings is provided. The structure includes a substrate, a first electrode line, an insulating layer, an etching buffer layer, and a second electrode line. The first electrode line is disposed on the substrate. The insulating layer is disposed on the gate line and the substrate. The etching buffer layer is disposed overlying the insulating layer and aligned with the first electrode line. The second electrode line is disposed overlying the etching buffer layer and the substrate and extends perpendicular to the gate line. Moreover, the etching buffer layer overlapping the second electrode line has non-linear edges.

Moreover, such edges can be curvilinear, waved, sawtoothed, stepped, polygonal or have any regularly or irregularly non-linear profile.

Moreover, the etching buffer layer can be a silicon nitride layer not wider than the first electrode line.

Moreover, the insulating layer can be a silicon nitride or silicon oxide layer.

Additionally, according to the object of the invention, a flat panel display with a structure to prevent a data line from opening is provided. The structure includes a substrate, a first electrode having a gate electrode and a gate line, an insulating layer, a semiconductor layer, a doped semiconductor layer having a source layer and a drain layer, a second electrode line having a drain electrode and a source electrode, and a passivation layer having a channel protective layer and an etching buffer layer. The first electrode line is disposed on the substrate and the insulating layer is disposed on the first electrode line and the substrate. The semiconductor layer is disposed on the insulating layer and the doped semiconductor layer is disposed on the semiconductor layer. The second electrode line is disposed on the doped semiconductor layer, wherein the source electrode extends perpendicular to the gate line of the first electrode line. The channel protective layer of the passivation layer is disposed between the semiconductor layer overlying the gate electrode of the first electrode line and the source and drain layers of the doped semiconductor layer. The etching buffer layer of the passivation layer is disposed on the semiconductor layer between the gate line of the first electrode line and the source electrode of the second electrode line. Moreover, the overlapping etching buffer layer between the source electrode and the gate line of the first electrode line has non-linear edges.

Moreover, such edges can be curvilinear, waved, sawtoothed, stepped, polygonal or any regularly or irregularly non-linear.

Moreover, the etching buffer layer can be a silicon nitride layer not wider than the gate line of the first electrode line.

Moreover, the insulating layer can be a silicon nitride or silicon oxide layer. The semiconductor layer can be a polysilicon or amorphous silicon layer. The doped semiconductor layer can be an n-type doped amorphous silicon layer.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 5:
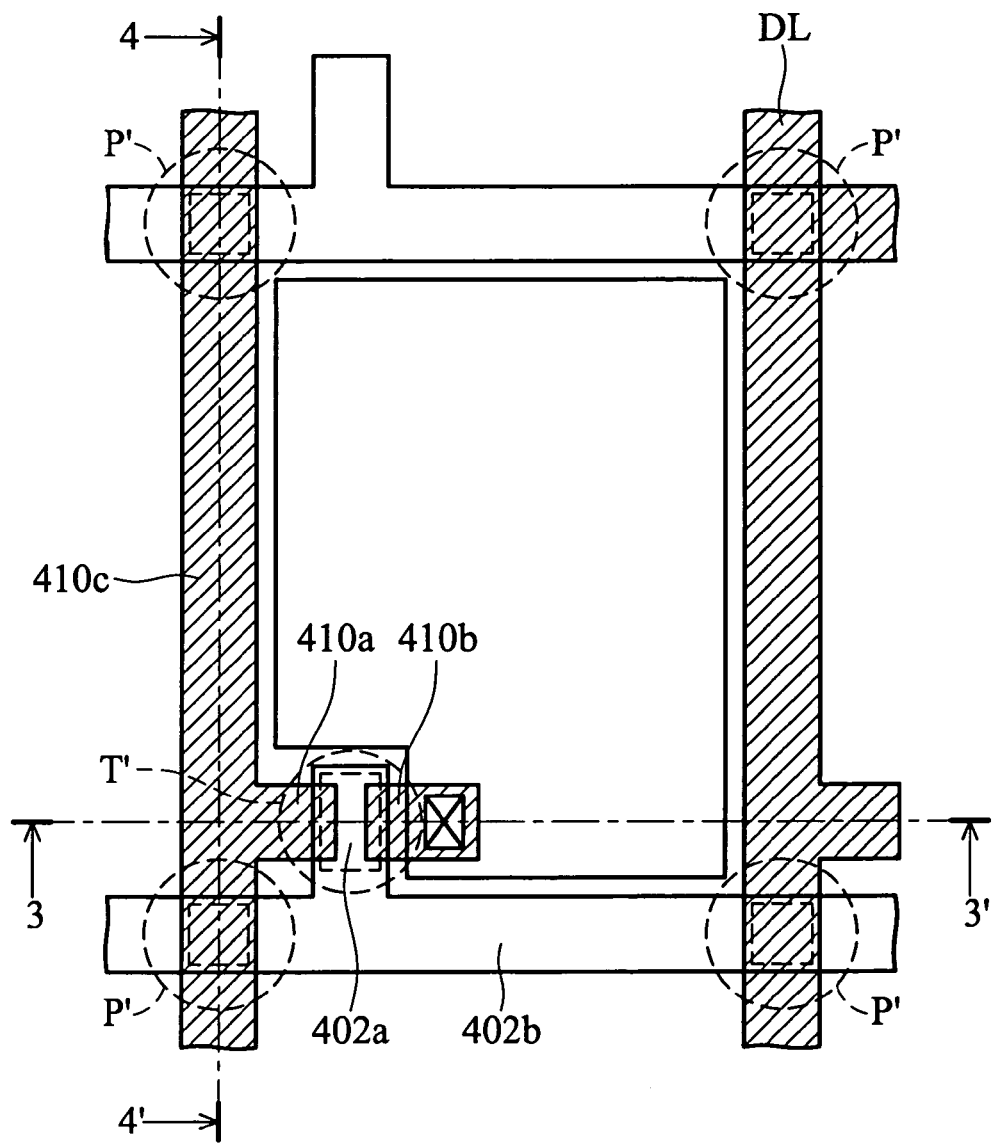
FIG. 5 is a plane view of an etch-stopper type TFT structure in a flat panel display according to the invention.
Figure 6:
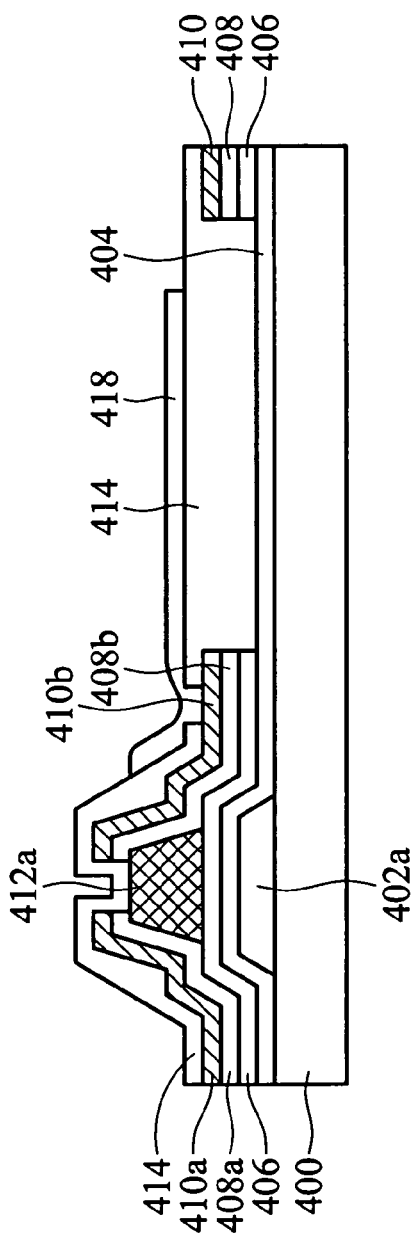
FIG. 6 is a cross-section along the 3-3' line shown in FIG. 5.
Figure 7:
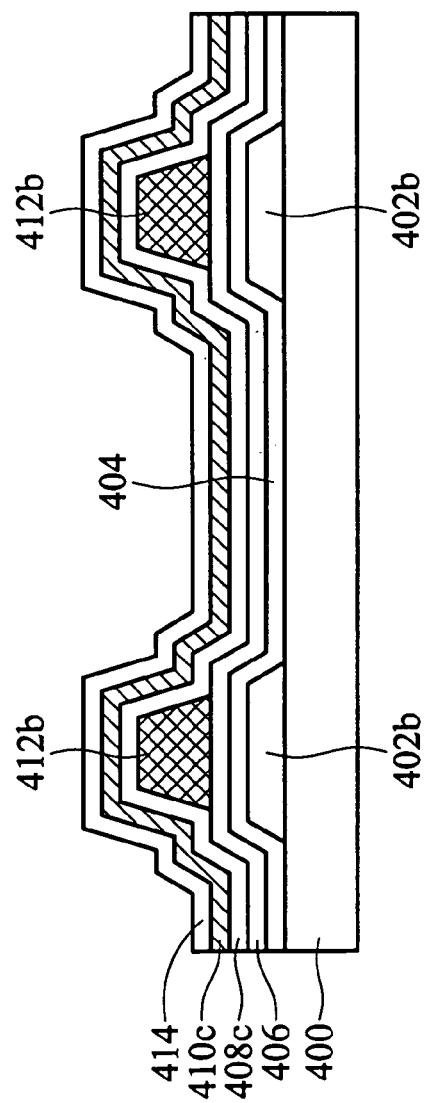
FIG. 7 is a cross-section along the 4-4' line shown in FIG. 5.

In FIG. 5, a gate electrode 402a extends outwardly to form a gate line 402b. Moreover, a source electrode 410a and a drain electrode 410b are respectively disposed on both sides of the gate electrode 402a. The source electrode 410a extends outwardly to form a data line 410c perpendicular to the gate line 410b. A passivation layer is formed over the TFT, as shown by the area T' in FIG. 5, and is the channel protective layer, and in overlapping area between the gate line 402b and the data line 410c, as shown by the area P' in FIG. 5, and is the etching buffer layer. A cross-section of area T' is shown in FIG. 6 and that of the area P' is shown in FIG. 7. A substrate 400, such as a glass or quartz substrate, is provided. A first electrode line having a gate electrode 402a and a gate line (scan line) 402b extending from the gate electrode 402a is disposed on the substrate 400. A conformable insulating layer 404, such as a silicon nitride ($Si_3N_4$) or silicon oxynitride ($SiO_xN_y$) layer, covers the gate electrode 402a, the gate line 402b, and the substrate 400. A semiconductor layer 406, such as a polysilicon or amorphous silicon layer, is disposed on the insulating layer 404. A channel protective layer 412a of passivation material is disposed on the semiconductor layer 406 over the gate electrode 402a, as shown in FIG. 6. Moreover, an etching buffer layer 412b of passivation material is disposed on the semiconductor layer 406 between the gate line 402b and the data line 410c, as shown in FIG. 7. The channel protective layer 412a and the etching buffer layer 412b can be of nitride, such as silicon nitride ($Si_3N_4$). A doped semiconductor layer, such as an n-type doped amorphous silicon layer, is disposed on the semiconductor layer 406, with two portions 408a and 408b serving as source and drain layers, respectively. A second electrode line includes a source electrode 410a and a drain electrode 410b, wherein the source electrode 410a extends perpendicular to the gate line 402b to form a data line 410c.

In the area T' shown in FIG. 6, the source electrode 410a and the drain electrode 410b are respectively disposed on both sides of the channel protective layer 412a. The channel protective layer 412a protects the semiconductor layer from damage. In the area P' shown in FIG. 7, the etching buffer layer 412b is disposed on the semiconductor layer 406 overlapping the data line 410c and the gate line 402b.

Figure 1:
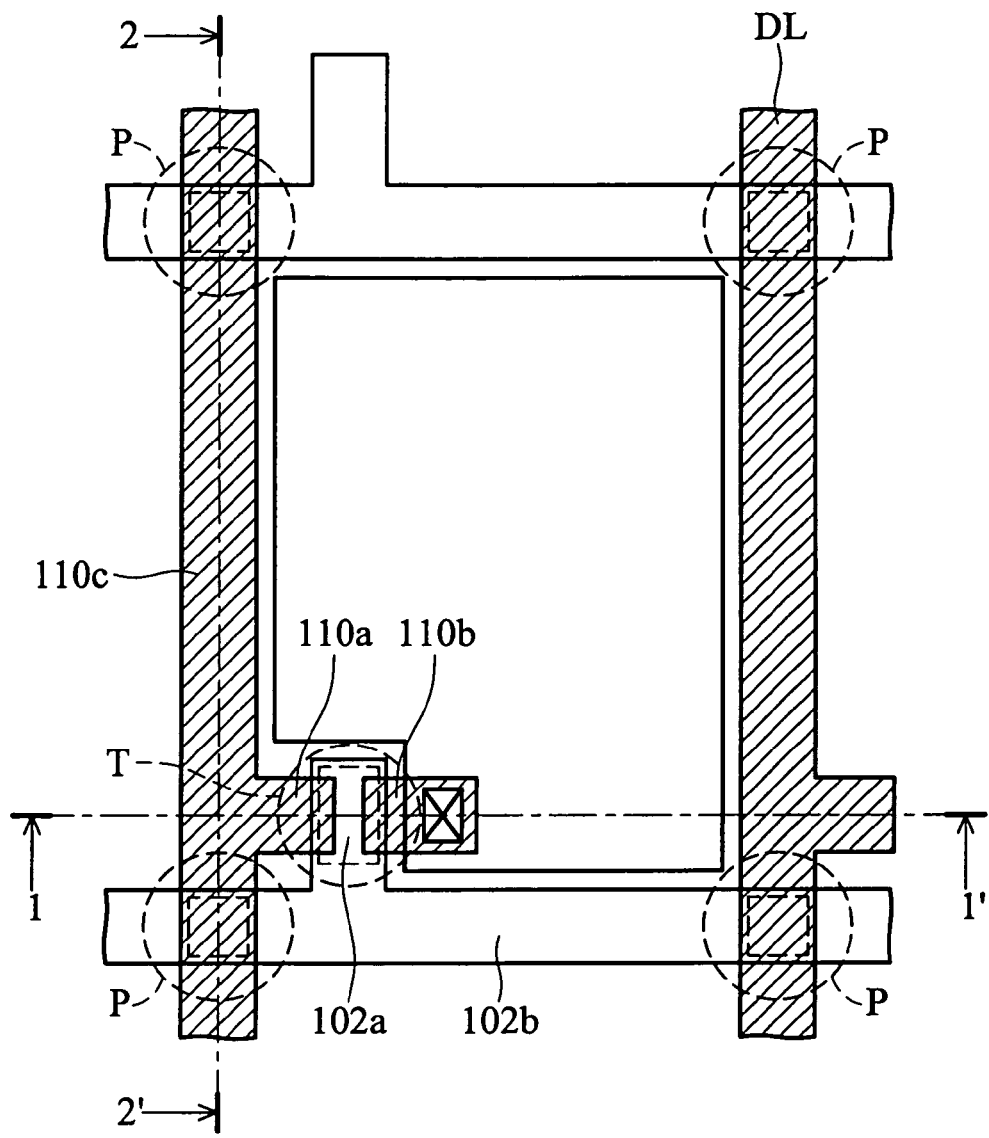
FIG. 1 is a plane view of a conventional etch-stopper type TFT structure in a flat panel display.
Figure 2:
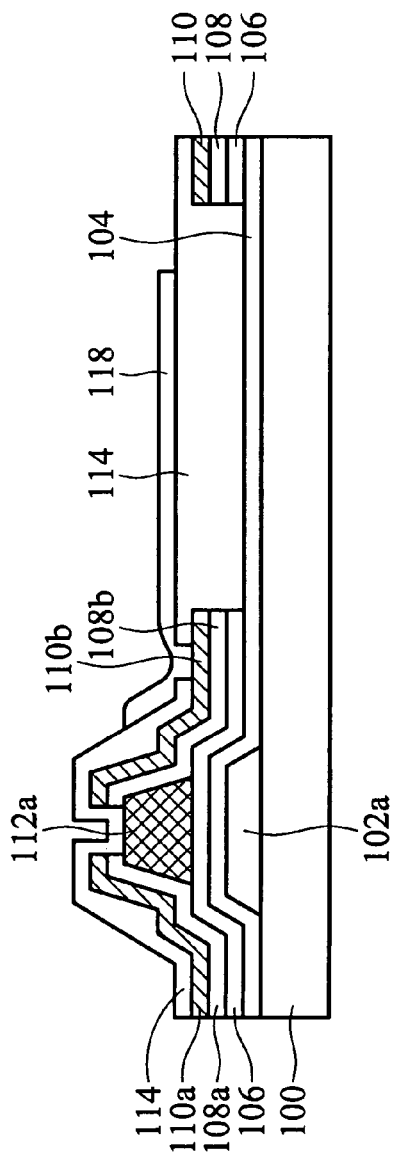
FIG. 2 is a cross-section along the 1-1' line shown in FIG. 1.
Figure 3:
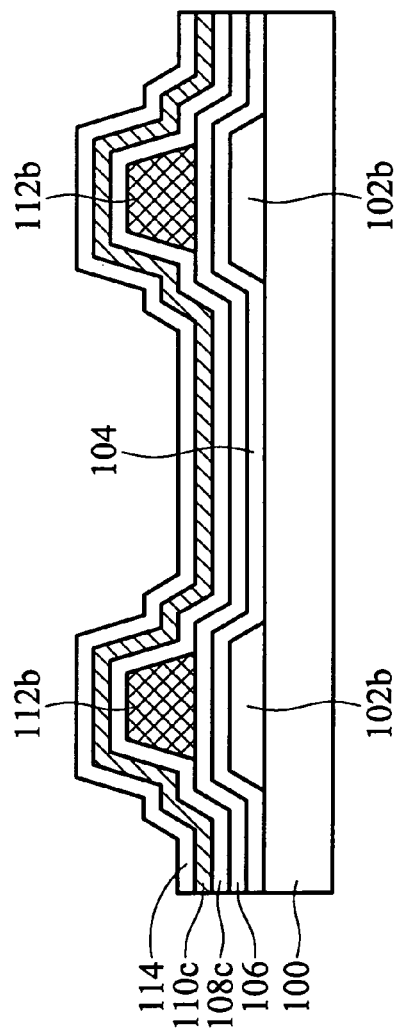
FIG. 3 is a cross-section along the 2-2' line shown in FIG. 1.
Figure 4:
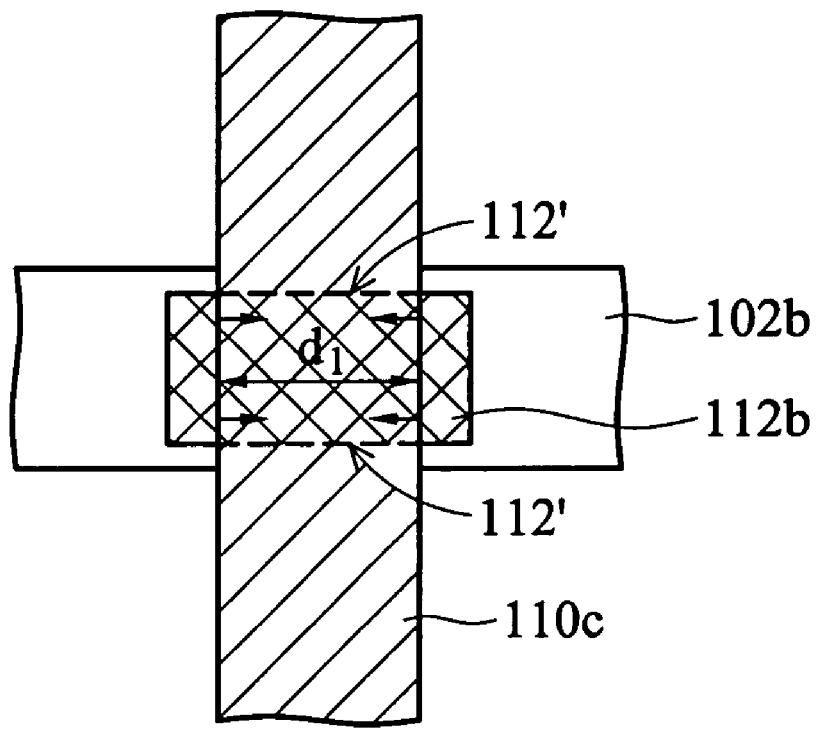
FIG. 4 is an enlarged diagram of the area P shown in FIG. 1.
Figure 8:
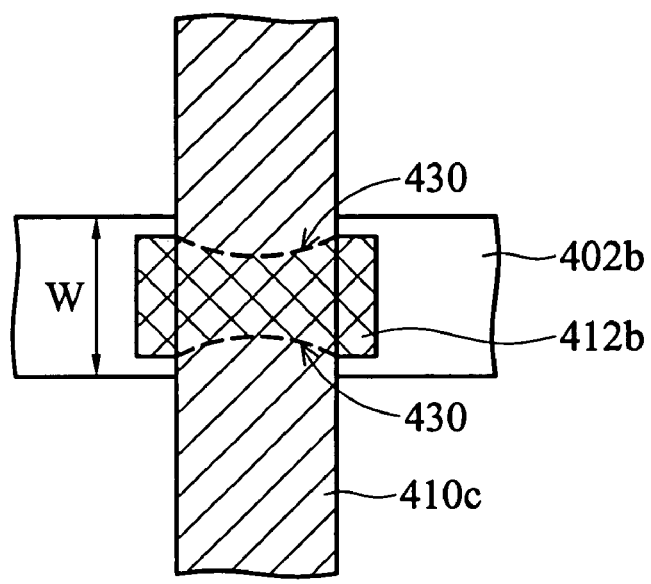
FIG. 8 is a plane view of a structure preventing electrode line openings for a flat panel display according to one example of the invention.
Figure 9:
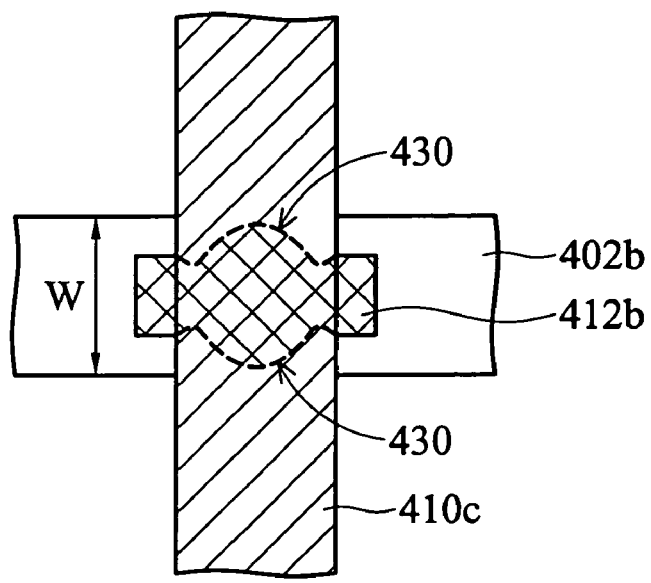
FIG. 9 is a plane view of a structure preventing electrode line openings for a flat panel display according to another example of the invention.
Figure 10:
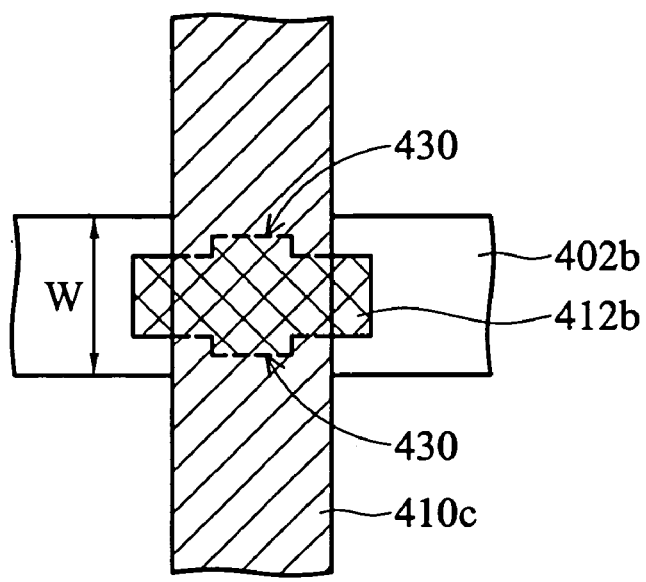
FIG. 10 is a plane view of a structure preventing electrode line openings for a flat panel display according to another example of the invention.
Figure 11:
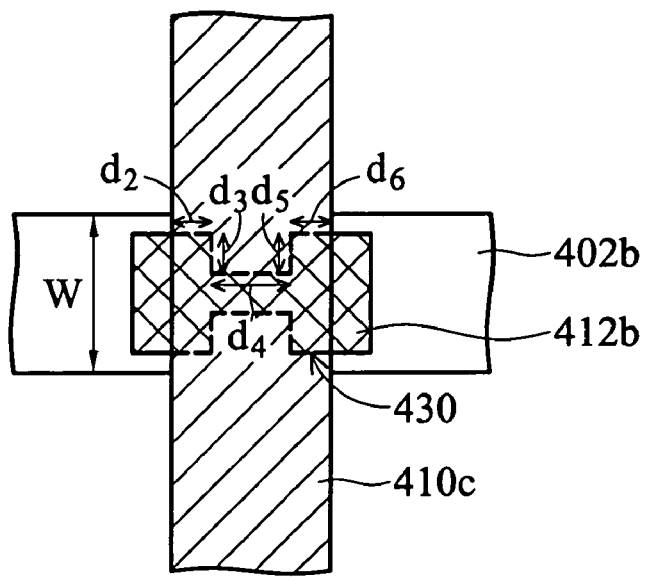
FIG. 11 is a plane view of a structure preventing electrode line openings for a flat panel display according to another example of the invention.

FIGS. 8 to 11 respectively illustrate a plane view of a structure preventing electrode line openings for a flat panel display. FIGS. 8 to 11 are enlarged diagrams of the area P' shown in FIG. 5. The etching buffer layer 412b and the channel protective layer 412a are simultaneously formed of the same material. The etching buffer layer 412b overlapping between the data line 410c and the gate line 402b has non-linear edges 430, such as curvilinear (as shown in FIGS. 8 and 9), waved, saw-toothed, stepped (as shown in FIG. 10), polygonal or have any regularly or irregularly non-linear profile. That is, the edge 430 of the etching buffer layer 412b is longer than the edge 112' of the conventional etching buffer layer 112b shown in FIG. 4. For example, in FIG. 11, the length Di of the edge 430 of the etching buffer layer 412b is the sum of d2, d3, d4, d5, d6. Compared to the length Dp of the edge 112' (equal to d1), Di exceeds Dp. Accordingly, lateral etching is suppressed during data line 410c's fabrication by etching, thereby preventing data line 410c opening. Also, the edge 430 of the etching buffer layer 412b shown in FIGS. 8 to 10, respectively, provides the same advantage.

Referring to FIGS. 6 and 7, a structure preventing date line openings according to the invention is disclosed. First, a first electrode line is deposited on a substrate 400 by suitable deposition and then patterned to form a gate electrode 402a and a gate line (scan line) 402b.

Next, an insulating layer 404 is blanketly deposited on the gate electrode 402a, the gate line 402b, and the substrate 400 by suitable deposition.

Thereafter, a semiconductor layer 406 is deposited on the source area, the drain area, and the data line area.

Next, a passivation layer having a channel protective layer 412a and an etching buffer layer 412b is formed on the semiconductor layer 406 by two exposures. A front exposure is performed first to define the desired region and profiles of the channel protective layer 412a and the etching buffer layer 412b, the profile of the etching buffer layer 412b is shown in FIGS. 8 to 11. Thereafter, a rear exposure is performed, using the first electrode line having the gate electrode 402a and the gate line 402b as a photomask to ensure that the surface of semiconductor layer 406 is outside of the first electrode line without formation of the channel protective layer 412a and the etching buffer layer 412b. Additionally, width w of the etching buffer layer is not wider than the gate line 402b of the first electrode line.

Next, a doped semiconductor layer (not shown) and a metal layer (not shown) are successively deposited on the semiconductor layer 406, the channel protective layer 412a and the etching buffer layer 412b. The metal layer is subsequently etched to form the source electrode 410a, the drain electrode 410b and the data line 410c. Next, the doped semiconductor layer over the channel protective layer 412a in area T' shown in FIG. 5 is removed, forming the source layer 408a and the drain layer 408b on both sides of the channel protective layer 412a, respectively.

The data line 410c in area P' shown in FIG. 5 creates a non-linear surface. As a result, lateral etching caused by the linear profile of the etching buffer layer is suppressed.

Next, a capping layer 414, of silicon nitride, silicon oxide, or organic materials, is formed overlying the substrate 400 and exposes only a portion of the drain electrode 410b. Finally, a pixel electrode 418 is formed on the capping layer 414 and electrically connects the exposed drain electrode 410b.

The etching buffer layer 412b and the channel protective layer 412a of the invention are simultaneously formed using the same material. Moreover, the etching buffer layer 412b and the channel protective layer 412a are formed by two exposures, wherein the rear exposure utilizes the gate electrode 402a and the gate line 402b as a photomask. Accordingly, the etching buffer layer 412b of the invention can be aligned with the gate line 402b and is not greater than the gate line 402b.

As mentioned above, the invention overcomes the serious problem of electrode line opening by improving the profile of the etching buffer layer without substantially changing the structure of the flat panel display, and enables easy to fabricate without requiring additional tools.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A flat panel display with a structure preventing electrode line openings, comprising:
   a substrate;
   a first electrode line disposed on the substrate;
   an insulating layer disposed on the first electrode line and the substrate;
   an etching buffer layer overlying the insulating layer and aligned with the first electrode line, wherein the etching buffer layer has a projection onto the substrate that is completely covered by the first electrode line; and
   a second electrode line overlying and substantially perpendicularly across the etching buffer layer and the first electrode line to form an overlap area between the first electrode line and the second electrode line;
   wherein the etching buffer layer has at least one edge inside the overlap area that is non-linear.

2. The flat panel display of claim 1, wherein the edge of the-etching buffer layer is curvilinear, waved, saw-toothed, stepped, and polygonal or have any regularly or irregularly non-linear profile.

3. The flat panel display of claim 1, wherein the etching buffer layer is a silicon nitride layer.

4. The flat panel display of claim 1, wherein the insulating layer is a silicon nitride or silicon oxide layer.

5. The flat panel display of claim 1, further comprising a semiconductor layer disposed between the etching buffer layer and the insulating layer.

6. The flat panel display of claim 1, further comprising a doped semiconductor layer disposed between the etching buffer layer and the second electrode line.

7. A flat panel display with a structure preventing electrode line openings, comprising:
   a substrate;
   a first electrode line disposed on the substrate, wherein the first electrode line comprises a gate line and a gate electrode connected to the gate line;
   an insulating layer disposed on the first electrode line and the substrate;
   a semiconductor layer disposed on the insulating layer;
   a doped semiconductor layer disposed on the semiconductor layer, wherein the doped semiconductor layer comprises a source layer and a drain layer;
   a second electrode line disposed on the doped semiconductor layer, wherein the second electrode line comprises a drain electrode, a source electrode, and a data line, extending perpendicular to the gate line to form an overlap area between the gate line and the data line; and
   a passivation layer comprising:
   a channel protective layer disposed between the semiconductor layer overlying the gate electrode and the source and drain layers; and
   an etching buffer layer disposed on the semiconductor layer between the gate line and the data line, and having a projection onto the substrate that is completely covered by the gate line;
   wherein the etching buffer layer has at least one edge inside the overlap area-that is non-linear.

8. The flat panel display of claim 7, wherein the edge of the-etching buffer layer is curvilinear, waved, saw-toothed, stepped, and polygonal or have any regularly or irregularly non-linear profile.

9. The flat panel display of claim 7, wherein the channel protective layer having a projection onto the substrate that is completely covered by the gate electrode.

10. The flat panel display of claim 7, wherein the passivation is a silicon nitride layer.

11. The flat panel display of claim 7, wherein the insulating layer is a silicon nitride or silicon oxide layer.

12. The flat panel display of claim 7, wherein the semiconductor layer is a polysilicon or amorphous silicon layer.

13. The flat panel display of claim 7, wherein the doped semiconductor layer is an n-type doped amorphous silicon layer.

14. A flat panel display, comprising:
   a substrate;
   a first electrode line disposed on the substrate;
   an insulating layer disposed on the first electrode line and the substrate;
   a second electrode line substantially perpendicularly across the first electrode line to form an overlap area therebetween; and
   an etching buffer layer disposed on a portion of the insulating layer and located between the first electrode line and the second electrode line, wherein the etching buffer layer has at least one edge inside the overlap area that is non-linear.

15. The flat panel display of claim 14, wherein the etching buffer layer is substantially aligned with the first electrode line.

16. The flat panel display of claim 14, wherein the edge of the etching buffer layer is curvilinear, waved, saw-toothed, stepped, and polygonal or have any regularly or irregularly non-linear profile.

17. The flat panel display of claim 14, further comprising a semiconductor layer disposed between the etching buffer layer and the insulating layer.

18. The flat panel display of claim 14, further comprising a doped semiconductor layer disposed between the etching buffer layer and the second electrode line.

19. A flat panel display, comprising:
- a substrate;
- a first electrode line disposed on the substrate, wherein the first electrode line comprises a gate line and a gate electrode connected to the gate line;
- an insulating layer disposed on the first electrode line and the substrate;
- a semiconductor layer disposed on the insulating layer;
- a doped semiconductor layer disposed on the semiconductor layer, wherein the doped semiconductor layer comprises a source layer and a drain layer;
- a second electrode line disposed on the doped semiconductor layer, wherein the second electrode line comprises a drain electrode, a source electrode, and a data line, extending perpendicular to the gate line to form an overlap area between the gate line and the data line source electrode; and
- a passivation layer comprising:
  - a channel protective layer disposed between the semiconductor layer overlying the gate electrode and the source and drain layers; and
  - an etching buffer layer disposed on the semiconductor layer between the gate line and the data line;
- wherein the etching buffer layer has at least one edge inside the overlap area that is non-linear.

20. The flat panel display of claim 19, wherein the edge of the etching buffer layer is curvilinear, waved, saw-toothed, stepped, and polygonal or have any regularly or irregularly non-linear profile.

* * * * *